United States Patent [19]

Fujioka

[11] Patent Number: 5,332,298
[45] Date of Patent: Jul. 26, 1994

[54] DECELERATION FEEDBACK ELECTRONIC CONTROL SYSTEM FOR USE IN A BRAKE SYSTEM

[75] Inventor: Hideaki Fujioka, Itami, Japan

[73] Assignee: Sumitomo Electric Industries, Ltd., Osaka, Japan

[21] Appl. No.: 158,401

[22] Filed: Nov. 29, 1993

[30] Foreign Application Priority Data

Dec. 2, 1992 [JP] Japan .................................. 4-323151

[51] Int. Cl.⁵ .......................................... B60T 13/68
[52] U.S. Cl. ..................................... 303/20; 180/197;
303/3; 303/15; 303/113.4; 188/158; 188/181 A
[58] Field of Search .................... 303/20, 2-3,
303/91, 100, 96, 97, 15, 103-111, 113.4;
364/426.01, 426.02, 426.03, 424.01, 426.04;
180/197; 188/158, 156, 161, 181 A, 181 R

[56] References Cited

U.S. PATENT DOCUMENTS

| | | |
|---|---|---|
| 3,829,167 | 8/1974 | Rouf et al. |
| 4,402,047 | 8/1983 | Newton et al. .................. 303/20 X |
| 4,671,576 | 6/1987 | Fouria ............................. 303/20 X |
| 4,721,344 | 1/1988 | Frait et al. ........................ 303/20 |
| 4,795,219 | 1/1989 | Brearley et al. ................. 303/15 X |
| 5,169,215 | 12/1992 | Takata . |

FOREIGN PATENT DOCUMENTS 56-33254 8/1981 Japan .
3164360 7/1991 Japan .

Primary Examiner—Douglas C. Butler
Attorney, Agent, or Firm—Sandler, Greenblum & Bernstein

[57] ABSTRACT

A braking control system is provided in which a braking force is controlled so that a braking effect corresponding to the human brake pedal input can be obtained by electronically controlling an auxiliary power other than a human power. The braking control system includes a current deceleration detection device that detects a current deceleration, an initial deceleration detection device that detects an initial deceleration at a human operation input start time, and a control target addition quantity setting device that sets up a control target addition quantity based on a signal of the human operation input quantity. A control target quantity device is also provided that sets up a control target quantity by adding the initial deceleration and the control target addition quantity, so that an optimum braking deceleration corresponding to a pedal stroke is obtained regardless of the magnitude of a car deceleration in a braking operation.

3 Claims, 4 Drawing Sheets

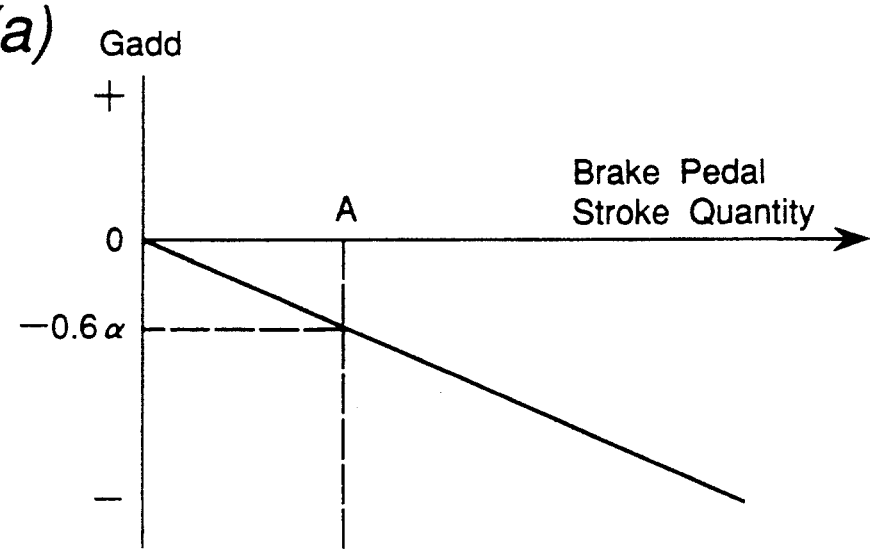
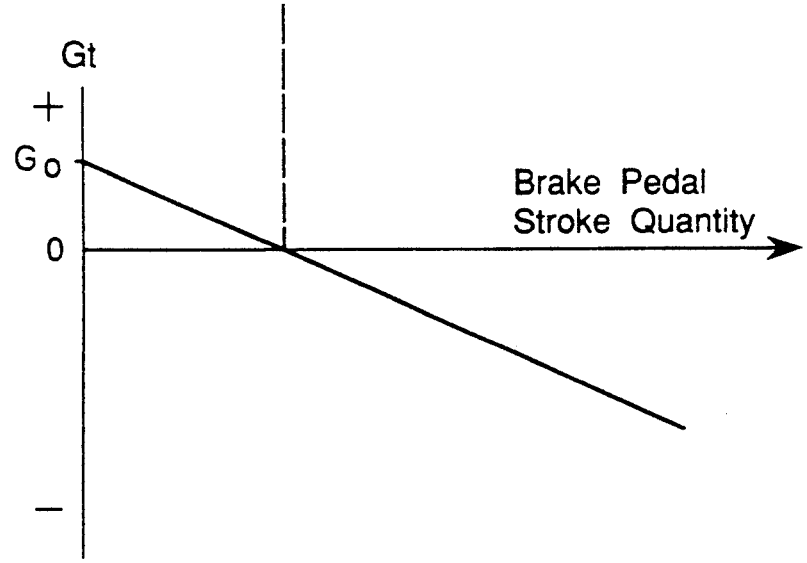

DECELERATION FEEDBACK ELECTRONIC CONTROL SYSTEM FOR USE IN A BRAKE SYSTEM

BACKGROUND OF THE INVENTION

1. Field of the Invention

The present invention relates to an improvement of a brake control system, in particular to an electronic control system for a brake system which detects a human brake operation input quantity such as a brake-pedal stroke and electronically controls a braking effect to obtain appropriate deceleration of a car speed according to the detected human operation input.

2. Description of the Prior Art

It is to be noted here that the term "deceleration" means a rate of decrease of speed of a motion, in other words, indicates a value of negative acceleration.

Conventionally, disclosed is an electronic control brake system, for example, in the Japanese Patent Publication SHO 56-033254 in which a constant deceleration of a car speed is achieved in response to a specified human operation input quantity for braking without changing a braking effect regardless of increase or decrease of a carrying load on a car, a frictional factor of a brake friction member, and the like.

However, the above-mentioned conventional control system has a difficulty in controlling the braking effect when driving a car on a slope. In more detail, there is a case where a certain braking force is required for obtaining a constant speed when driving a car on a downward slope. Even when a braking operation is effected to generate a braking force for obtaining a constant speed, a brake fluid pressure is automatically so controlled as to generate undesirable deceleration corresponding to the braking operation input quantity, resulting in failure in achieving a car running at a constant speed due to the generated deceleration.

For example, when a car is running down a slope at an acceleration of 0.6 $\alpha$ (hereinafter, "$\alpha$" denotes a constant value of a positive acceleration), if a brake pedal stroke corresponding to a deceleration of 0.2 $\alpha$ is effected in order to decrease the acceleration from 0.6 $\alpha$ to about 0.4 $\alpha$, an abrupt braking force is generated to abruptly reduce the car speed at a deceleration of 0.2 $\alpha$ (i.e., acceleration of $-0.2\ \alpha$), which results in an awkward braking operation.

In view of the drawbacks mentioned above, the Japanese Patent Laid-Open (Unexamined) HEI 3-164360 discloses a brake system in which a braking force is so controlled as to obtain a predetermined deceleration or acceleration of a car speed as shown in FIG. 4. In more detail, when a human operation input quantity for braking is in a range larger than a specified value $L_0$, a predetermined deceleration of a car speed is achieved as shown by a real curved line in FIG. 4, and on the other hand, when a braking operation input quantity is smaller than $L_0$, the braking force is so controlled or so released as to permit an acceleration within a predetermined value as shown by a broken curved line in the figure, where the value $L_0$ is so specified as to control the deceleration (or acceleration) to be 0 (zero).

However, since there is no consideration for the running conditions of a car before effecting a braking operation in the above-mentioned control system, the following disadvantage takes place.

In particular, when a further deceleration is desired to be added by stepping the brake pedal while a car is running up a slope at a deceleration of 0.6 $\alpha$ (i.e., acceleration of $-0.6\ \alpha$), no braking effect is generated at an initial state, in other words, the deceleration of 0.6 $\alpha$ of the car speed is maintained in the initial stage of the braking operation so long as the pedal stroke is in the range smaller than that corresponding to the deceleration of 0.6 $\alpha$. When the pedal stroke exceeds the value corresponding to the deceleration of 0.6 $\alpha$, the further deceleration is then effected for the first time. Therefore, no change of the deceleration of the car speed takes effect in the initial stage of stepping the brake pedal to result in generating no braking effect. The fact that the operation of stepping the brake pedal takes no effect in the initial stage is not only undesirable but also even dangerous.

SUMMARY OF THE INVENTION

Accordingly, the present invention was made in order to solve the problem mentioned above, and an essential objective of the present invention is to provide a deceleration feedback electronic control system for a brake system capable of obtaining an optimum braking deceleration corresponding to a brake pedal stroke. The optimum braking deceleration is achieved by taking into account the condition of the deceleration of the car speed when a driver steps the brake pedal while driving on a downward or upward slope.

In order to achieve the objective mentioned above, a braking force is controlled so that a braking effect corresponding to a human brake operation input quantity can be obtained by electronically controlling an auxiliary power such as an electric motor for a hydraulic system and a unit utilizing a hydraulic pressure stored in an accumulator and the like, other than a human power in a deceleration feedback electronic brake control system of the present invention. The electronic control system for a brake system of the present invention comprises:

operation input detecting means for detecting a human operation input quantity;

operation input start time detecting means for detecting a human operation input start time;

current deceleration detecting means for detecting a current deceleration of a car speed;

initial deceleration detecting means for detecting an initial deceleration of the car based on the deceleration derived from the current deceleration detecting means in response to the human operation input start time detected by the operation input start time detecting means;

control target addition quantity setting means for setting up a control target addition quantity based on a signal of the human operation input quantity detected by the operation input detecting means;

control target quantity setting means for setting a control target quantity by adding the initial deceleration detected by the initial deceleration detecting means and the control target addition quantity set up by the control target addition quantity setting means; and control command output means for generating a control command signal by subtracting the control target quantity set up by the control target quantity setting means from the deceleration derived from the current deceleration detecting means.

The brake control system may further comprise wheel speed detecting means for detecting a speed of each wheel so that the current deceleration detecting means detects the current deceleration based on the wheel speed detected by the wheel speed detecting means.

With the above-mentioned construction, the car condition before a human braking operation is started, i.e., the initial deceleration of the car is detected. The control target addition quantity set up based on the signal of the operation input quantity carried out by the driver is merely served as an additional quantity to be added to the initial deceleration. By using the added resultant value as a target acceleration or deceleration of the car speed, the desired braking deceleration can be obtained.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 2(a) and 2(b) are timing charts for showing a control operation of the system shown in FIG. 1;

DETAILED DESCRIPTION OF THE PREFERRED EMBODIMENTS

The following describes a preferred embodiment of a brake control system in accordance with the present invention with reference to the attached drawings.

Figure 1:
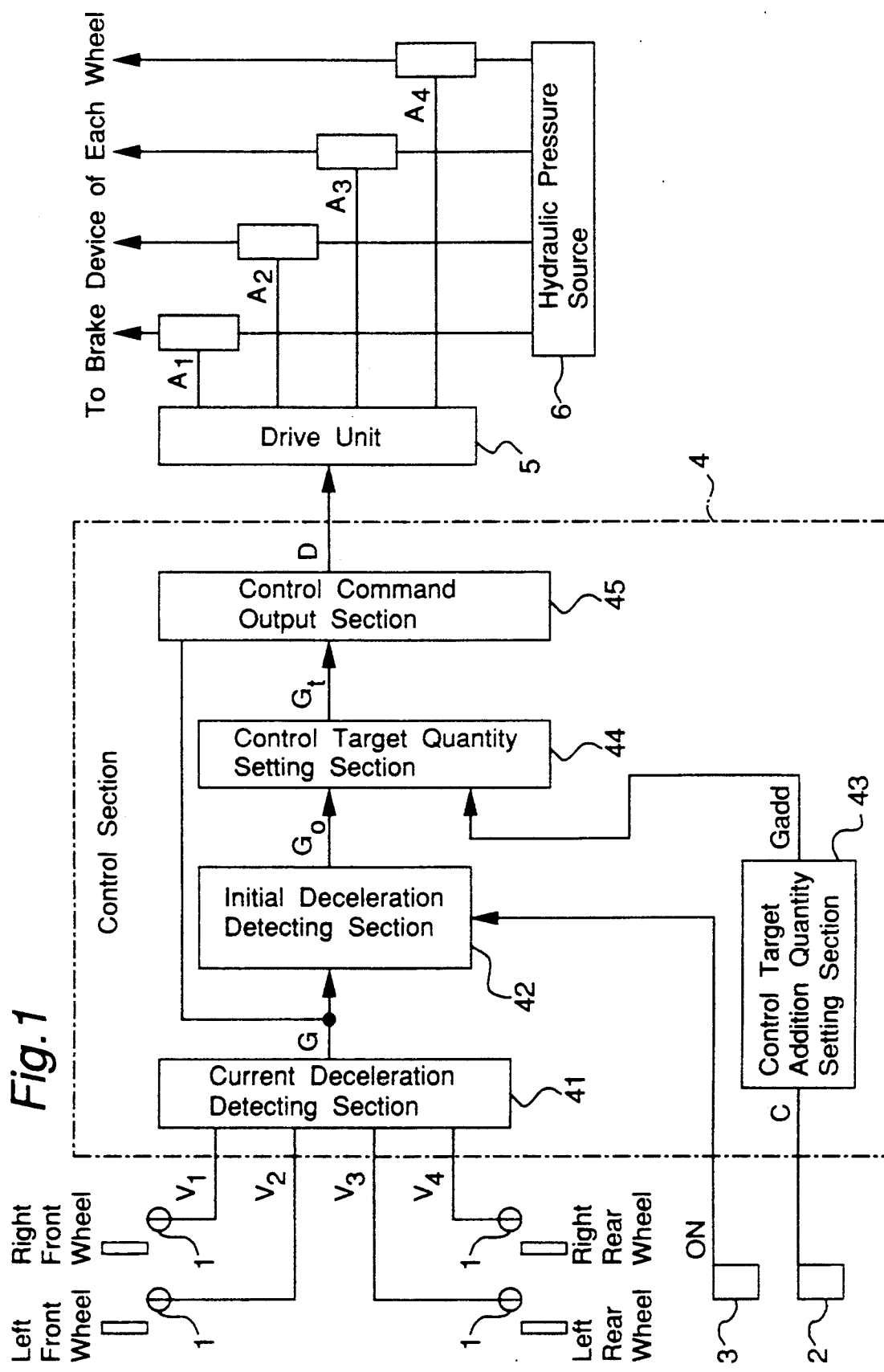
FIG. 1 is a block diagram of a brake control system in accordance with an embodiment of the present invention.

FIG. 1 shows an entire part of the brake control system according to the embodiment of the present invention.

Referring to FIG. 1, the brake control system includes a wheel speed sensor 1 which detects a speed of each wheel, a stroke sensor 2 which detects a quantity of a brake pedal stroke, a stop switch 3 which is turned on when starting the stepping operation on the brake pedal, and a control section 4 including various units for controlling the braking effect in the brake system, which the control section 4 is operatively connected to a drive unit 5 for driving a brake device (not shown) of each wheel.

The control section 4 includes: a current deceleration detecting section 41; an initial deceleration detecting section 42; a control target addition quantity setting section 43; a control target quantity setting section 44; and a control command output section 45, where the sections 41, 42, 44 and 45 are electrically connected in series in this order, while the section 43 is interconnected between the stroke sensor 2 and the section 44.

In the control section 4, the current deceleration detecting section 41 receives wheel speed $V_1$ through $V_4$ derived from each wheel speed sensor 1 and detects a current deceleration signal G of a car speed depending on a change in time of the wheel speed $V_1$ through $V_4$ by performing a calculation of $dV/dt$. Therefore, the current deceleration G is represented by a function relating to time t. The current deceleration signal G is applied to both the initial deceleration detecting section 42 and the control command output section 45. The initial deceleration detecting section 42 receives the current deceleration signal G from the current deceleration detecting section 41 to obtain an initial deceleration $G_0$ of the car speed at an initial stage of stepping on the brake pedal based on the current deceleration G when an activation signal (ON) is applied from the stop switch 3 to the initial deceleration detecting section 42. The control target addition quantity setting section 43 sets up a control target addition quantity $G_{add}$ corresponding to the brake pedal stroke quantity C detected by the stroke sensor 2. Then, the control target quantity setting section 44 receives the initial deceleration $G_0$ from the initial deceleration detecting section 42 and also receives the control target addition quantity $G_{add}$ from the control target addition quantity setting section 43 thereby to sets up a signal of a control target quantity Gt by adding the initial deceleration $G_0$ and the control target addition quantity $G_{add}$. Then, the control command output section 45 receives the control target quantity signal Gt to generates a control command signal D by subtracting the control target quantity Gt from the current deceleration G fed from the current deceleration detecting section 41. The control command signal D which represents the difference between the current deceleration G and the control target quantity Gt is fed to the drive unit 5 from the control command output section 45.

The drive unit 5 controls actuators $A_1$ through $A_4$ which are operatively connected to a hydraulic pressure source 6 based on the control command signal D fed from the control command output section 45 thereby to control the hydraulic pressure to be applied to the brake device of each wheel.

The following describes a control operation of the brake control system constructed as mentioned above under the same operating conditions as described on the conventional examples (i) through (iii):

(i) In the case where a constant running speed of a car is desired on a way of going down a slope at an acceleration of, for example, 0.6 $\alpha$:

As shown in the graph of FIG. 2(a), when a brake pedal is stepped by a driver so that a brake pedal stroke quantity A corresponds to a deceleration of 0.6 $\alpha$, the stroke quantity A is detected by the stroke sensor 2. Then, the initial deceleration $G_0$ of the car is $-0.6\ \alpha$ and the control target addition quantity $G_{add}$ output from the control target addition quantity setting section 43 is 0.6 $\alpha$. Therefore, the control target quantity Gt is set to 0 (zero) by summing up $G_0$ of $-0.6\ \alpha$ and $G_{add}$ of 0.6 $\alpha$ as shown in FIG. 2(b). The signal of the quantity Gt is supplied from the control target quantity setting section 44 to the control command output section 45 to consequently allow the car to run at a constant speed on the slope.

(ii) In the case where a deceleration is desired while driving down a slope at an acceleration of, for example, 0.6 $\alpha$:

When a brake pedal stroke quantity corresponding to a deceleration of, for example, 0.2 $\alpha$ is detected by the stroke sensor 2 as a consequence of stepping on the brake pedal, the initial deceleration $G_0$ is $-0.6\ \alpha$ and the control target addition quantity $G_{add}$ is 0.2 $\alpha$. Therefore, the control target quantity Gt is set to $-0.4\ \alpha$ which is obtained by summing up $G_0$ of $-0.6\ \alpha$ and $G_{add}$ of 0.2 $\alpha$, and the resultant Gt of $-0.4\ \alpha$ is supplied from the control target quantity setting section 44 to the control command output section 45 to consequently reduce the acceleration from 0.6 α to 0.4 α.

(iii) In the case where a further deceleration is desired to be added while driving up a slope at a deceleration of, for example, 0.6 α (i.e., at an acceleration of −0.6 α):

When stepping a brake pedal with a stroke quantity corresponding to a deceleration of, for example, 0.2 α is detected by the stroke sensor 2 as a consequence of stepping on the brake pedal, the initial deceleration $G_0$ is 0.6 α and the control target addition quantity $G_{add}$ is 0.2 α. Therefore, the control target quantity Gt is set to 0.8 α which is obtained by summing up 0.6 α and 0.2 α, and the resultant Gt of 0.8 α is supplied from the control target quantity setting section 44 to the control command output section 45 to consequently increase the deceleration from 0.6 α to 0.8 α.

It should be noted that, although the deceleration G of the car speed is obtained based on the wheel speed data signal output from each wheel speed sensor 1 in the above-mentioned embodiment in FIG. 1, the deceleration may be obtained by providing an acceleration sensor as a current deceleration detecting section in a car body without providing a wheel speed sensor in a modified example. In this case, the deceleration is directly obtained from a signal transmitted from the acceleration sensor provided separately in the modification. In such a modified example, there is a slight variation in controlling the system.

Figure 3:
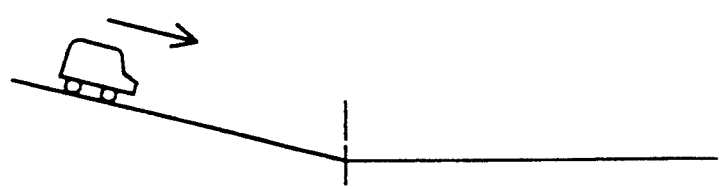
FIGS. 3(a), 3(b) and 3(c) are graphs for showing a variation of a brake control operation depending on whether a wheel speed sensor is used or an acceleration sensor is used for obtaining a deceleration of a car in the system shown in FIG. 1.
Figure 3:
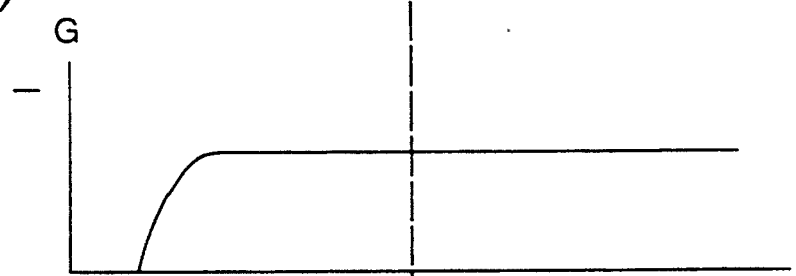
Figure 3:
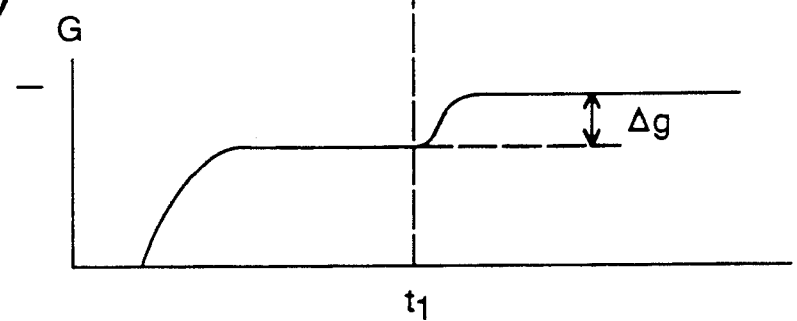
Figure 4:
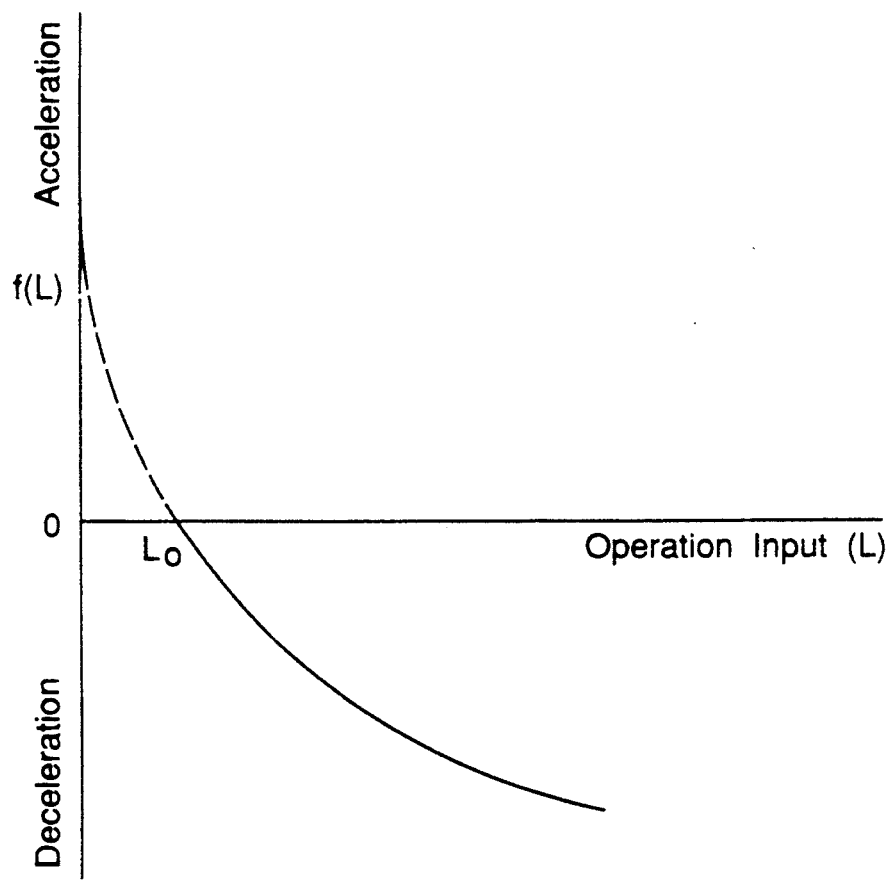
FIG. 4 is a graph showing a relation between an operation input quantity and acceleration or deceleration in a conventional brake system.

In more detail, the graph of FIG. 3(a) shows a case where a braking operation is effected while driving down a slope and then the road becomes horizontal after a time $t_1$. When the signal from the wheel speed sensor is used, the true deceleration of the car speed always depends on the input signal. Therefore, the deceleration G of the car with respect to the wheel is constant after the time $t_1$ as shown in the graph of FIG. 3(b). On the other hand, when the acceleration sensor is used, the car deceleration G increases by Δg corresponding to the slope after the time $t_1$ as shown in the graph of FIG. 3(c).

According to the present invention described as above, the value (Gt) obtained by summing up the initial deceleration ($G_0$) at the time of stepping on the brake pedal and a control target addition quantity ($G_{add}$) corresponding to the brake pedal stroke quantity is used as a control target set-up value. Therefore, a desired braking deceleration corresponding to the brake pedal stroke quantity can be obtained regardless of the magnitude of the initial deceleration of the car speed.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A brake control system for obtaining an optimum braking deceleration corresponding to a brake pedal stroke in which a braking force is controlled so that a braking effect corresponding to a human brake operation input quantity is obtained by electronically controlling an auxiliary power other than a human power, said brake control system comprising:

operation input detecting means for detecting a human operation input quantity;

operation input start time detecting means for detecting a human operation input start time;

current deceleration detecting means for detecting a current deceleration of a car speed;

initial deceleration detecting means for detecting an initial deceleration of the car based on the deceleration derived from said current deceleration detecting means in response to the human operation input start time detected by said operation input start time detecting means;

control target addition quantity setting means for setting up a control target addition quantity based on a signal of the human operation input quantity detected by said operation input detecting means;

control target quantity setting means for setting a control target quantity by adding the initial deceleration detected by said initial deceleration detecting means and the control target addition quantity set up by said control target addition quantity setting means; and control command output means for generating a control command signal by subtracting the control target quantity set up by said control target quantity setting means from the deceleration derived from said current deceleration detecting means.

2. The brake control system as claimed in claim 1 further comprising wheel speed detecting means for detecting a speed of each wheel so that said current deceleration detecting means detects the current deceleration based on the wheel speed detected by said wheel speed detecting means.

3. The brake control system as claimed in claim 1, wherein said current deceleration detecting means is comprised of an acceleration sensor for sensing an acceleration of the car speed so that the current deceleration is directly obtained based on the acceleration detected by said acceleration sensor means.

* * * * *